Sept. 6, 1955 W. S. H. HAMILTON 2,717,332

STARTING AND OPERATING CIRCUITS FOR FLUORESCENT LAMPS

Filed June 6, 1951 6 Sheets-Sheet 1

INVENTOR:
William S.H. Hamilton,
By C. A. Hines,
BY
ATTORNEY.

Sept. 6, 1955 W. S. H. HAMILTON 2,717,332

STARTING AND OPERATING CIRCUITS FOR FLUORESCENT LAMPS

Filed June 6, 1951 6 Sheets-Sheet 2

INVENTOR:
William S. H. Hamilton,
BY
ATTORNEY.

Sept. 6, 1955 W. S. H. HAMILTON 2,717,332

STARTING AND OPERATING CIRCUITS FOR FLUORESCENT LAMPS

Filed June 6, 1951 6 Sheets-Sheet 3

INVENTOR:
William S.H. Hamilton,

By
A. C. Hines,
BY

ATTORNEY.

Sept. 6, 1955 W. S. H. HAMILTON 2,717,332

STARTING AND OPERATING CIRCUITS FOR FLUORESCENT LAMPS

Filed June 6, 1951 6 Sheets-Sheet 4

INVENTOR:
William S. H. Hamilton,
By
BY [signature]
ATTORNEY.

Sept. 6, 1955 W. S. H. HAMILTON 2,717,332

STARTING AND OPERATING CIRCUITS FOR FLUORESCENT LAMPS

Filed June 6, 1951 6 Sheets-Sheet 5

INVENTOR:

William S. H. Hamilton,

By

ATTORNEY.

Sept. 6, 1955 W. S. H. HAMILTON 2,717,332

STARTING AND OPERATING CIRCUITS FOR FLUORESCENT LAMPS

Filed June 6, 1951 6 Sheets-Sheet 6

INVENTOR:
William S.H.Hamilton,

By E. C. Kinab,

ATTORNEY.

United States Patent Office 2,717,332

Patented Sept. 6, 1955

2,717,332

STARTING AND OPERATING CIRCUITS FOR FLUORESCENT LAMPS

William S. H. Hamilton, Larchmont, N. Y.

Application June 6, 1951, Serial No. 230,185

5 Claims. (Cl. 315—100)

This invention relates to starting and operating circuits for fluorescent lamps, and particularly for A. C. and D. C. fluorescent lamps which are more or less difficult to start and require an inductive kick to start them.

One object of the present invention is to provide circuit organizations embodying a combined thermal and magnetic type starter having normally closed thermal and magnetic starting contacts and a coil, the combination being so arranged that when the thermal starting contacts open, the coil is energized by the preheating current through the lamp filament or filaments to cause the magnetic contacts to be opened very rapidly to start the lamp, the coil thereafter remaining in series with the lamp while the lamp is operating, holding the magnetic starting contacts open by magnetic attraction and holding the thermal starting contacts open by means of an insulated mechanical interlock connected to said magnetic contacts, thus allowing cooling of the heater for the thermal starting contacts without permitting the thermal starting contacts to reclose, the circuits including reactance means for giving an inductive kick when the magnetic starting contacts open, whereby the lamp, if in normal condition, will fire and the lamp will burn until the line voltage is interrupted when the coil will be de-energized and both starting contacts will immediately reclose, enabling the lamp to restart without delay upon another application of line current.

A further object of my invention is to provide a starter having novel means for controlling its thermal and magnetic elements to secure a reliable and easy action of the parts in all normal starting operations and a rapid response in restarting a lamp which has been switched out of operation and when it is desired to quickly restart it.

A still further object of the invention is to provide a starter embodying these features and also a means for automatically locking out the starter in the attempted starting of a defective lamp or one which has passed its useful life period, in order to prevent injury to the starter or other components of the circuit.

Still further objects of the invention are to provide a starter which may be, if desired, one of reversible type in its socket, and a starter which will prevent the annoying "ghost lighting," objectionable in the use of certain types of lamps where cut out of action by conventional starters now used.

In a prior application for patent, Serial No. 187,593, filed September 29, 1950, I have disclosed a type of starter in which switches normally closing the starting circuit and controlling said circuit are mechanically united to each other and to a thermally responsive disk or element so as to be moved to circuit breaking postiion by thermal actuation of said disk or element, and in which the switches and their actuating element are held by a coil in circuit breaking position by current passing through the lamp when the lamp fires and during operation of the lamp.

The present invention provides a simpler and more rapidly operating starter in which the coil is activated by the preheating current of the lamp circuit after a thermally responsive switch is heated for a predetermined time, the coil in turn magnetically opening a second switch to break the preheating circuit rapidly and cut the heater of the thermally responsive switch out of action, the coil also serving to hold both switches open while the lamp is operating, whereby rapid starting and restarting actions of the lamp are obtained in a manner hereinafter described. The present invention also provides for the purpose a quick action restarter in the form of mechanical interlocking means which prevents the reclosing of the thermally responsive switch and deenergization of the coil when the switch heater cools off after the lamp has fired, and while the lamp is operating, while permitting independent opening movement of the thermally responsive switch in a starting operation and energization of the coil to cause it to open the magnetic switch to move certainly and rapidly to start the lamp.

The present invention also provides a means to lock the starter entirely out of action after a number of firing attempts have been made when the lamp is a defective one or has reached the end of its useful life period.

In the accompanying drawings, forming part of this specification,

Figures 4, 5, 6:
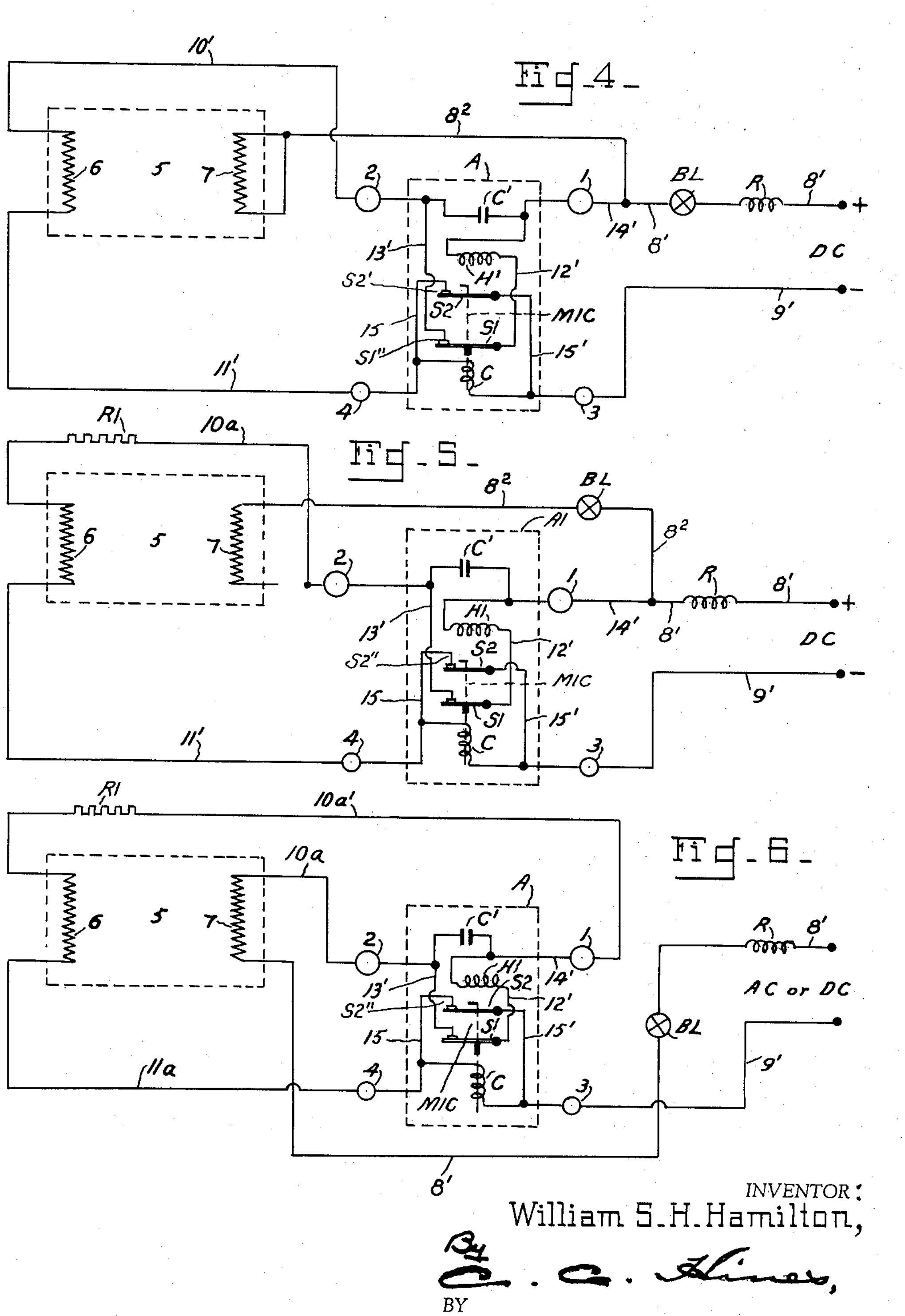
Figs. 4 and 5 are diagrammatic views of circuits for D. C. use and employing a plain reactor, a ballast lamp and a starter with the quick restarter but without the lock-out means.

Fig. 6 is a diagrammatic view of a circuit similar to Figs. 4 and 5 but adapted for A. C. or D. C. use.

Figs. 7, 8, 9 and 10 are diagrammatic views of different forms of circuits for D. C. use and which employ a starter embodying the quick restarter and the lock out means.

Figures 10, 11, 12:
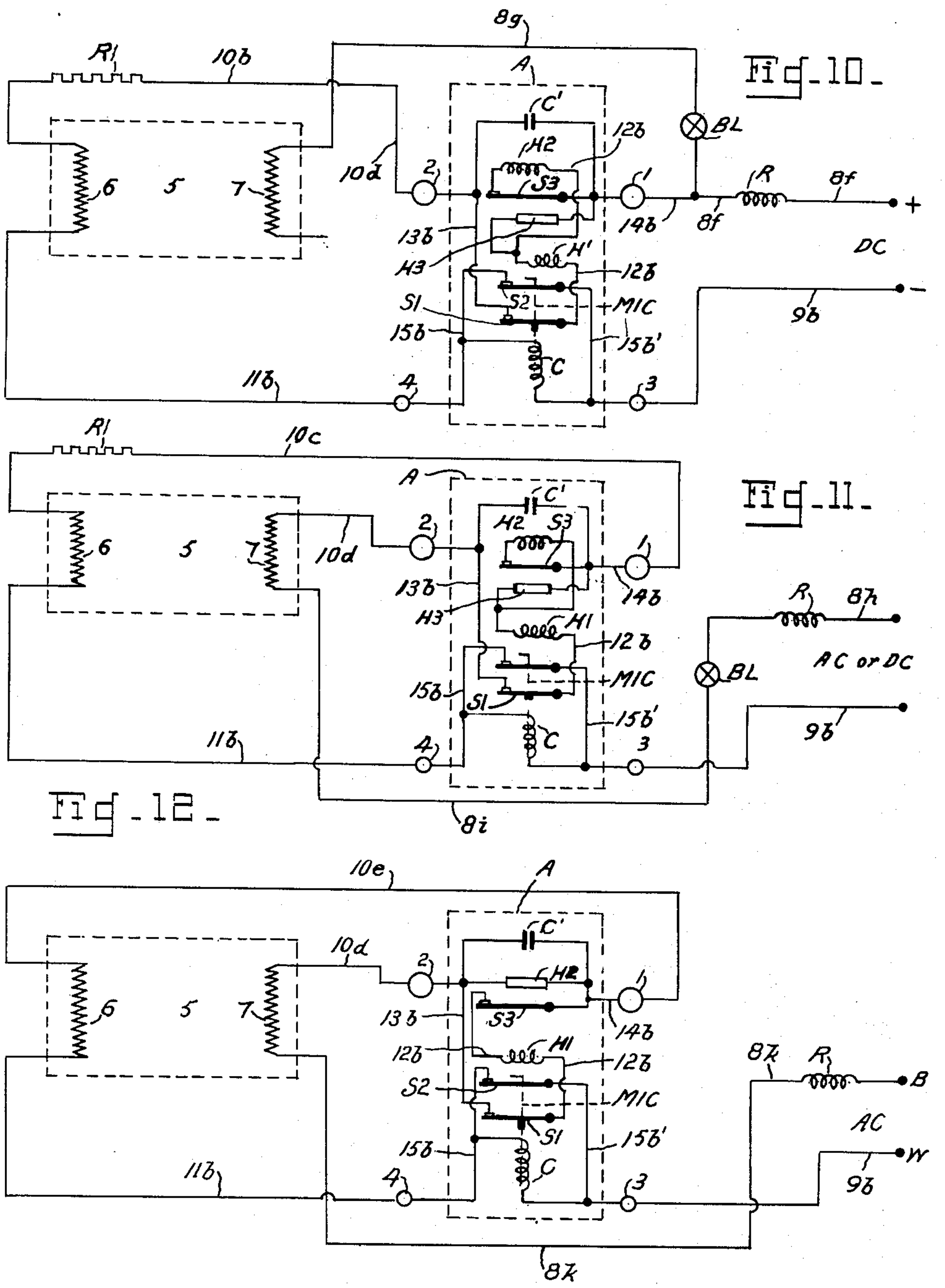

Fig. 11 is a diagrammatic view of a circuit using a starter embodying the quick restarter and lock-out means and which is suitable for either A. C. or D. C. use.

Fig. 12 is a diagrammatic view of a circuit similar to that of Fig. 11 but adapted for A. C. use.

Figures 13, 14, 15, 16, 17:
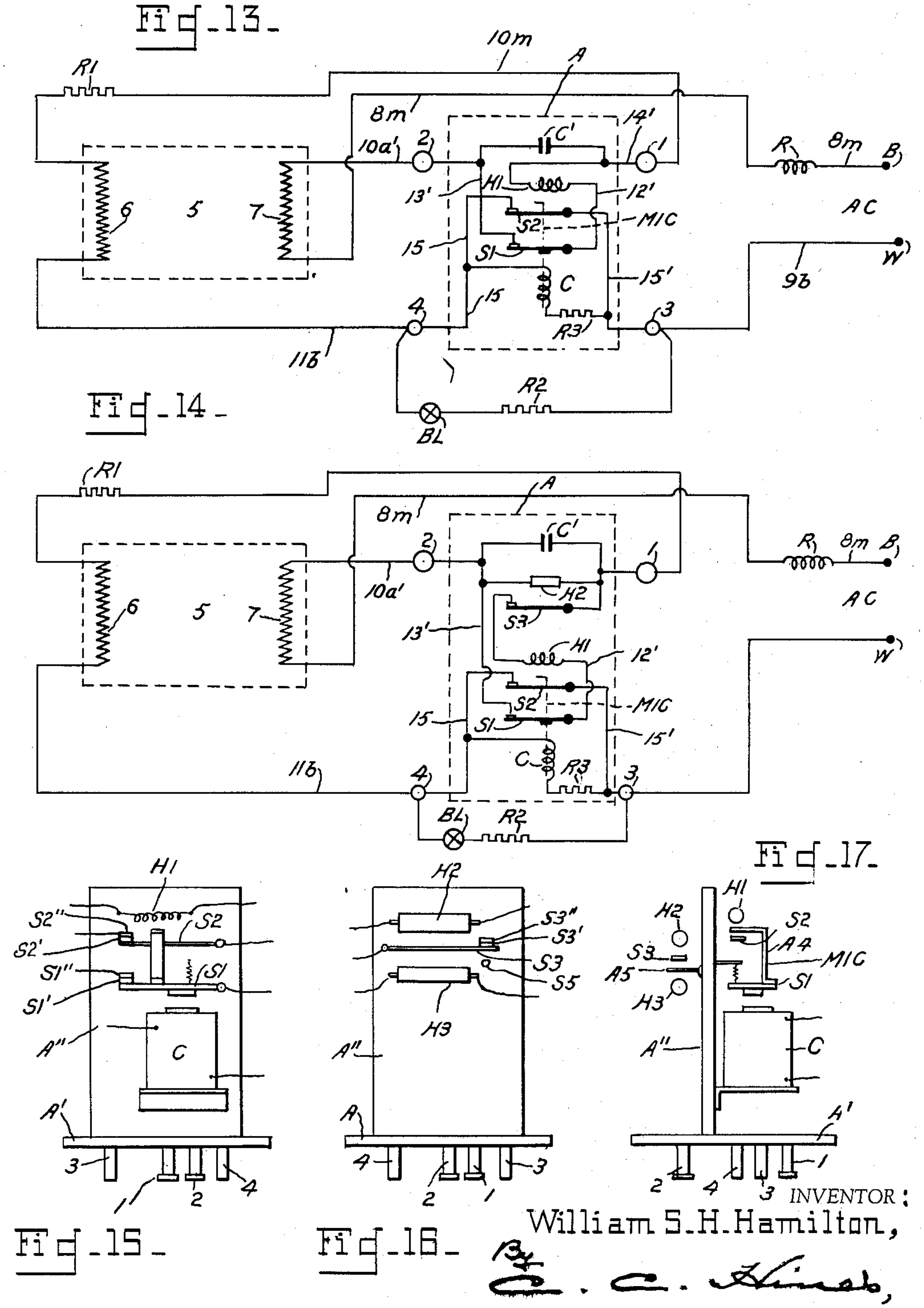
Figure 18:
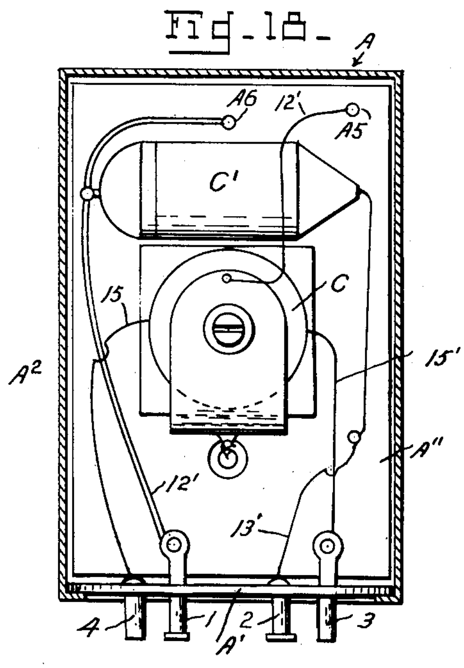
Figure 20:
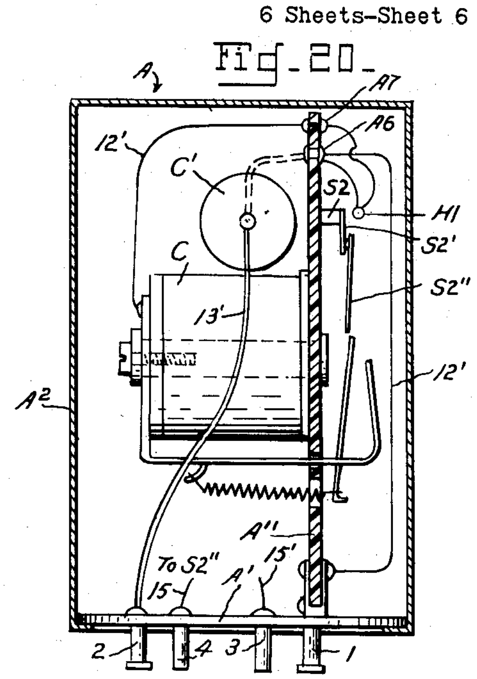
Figure 19:
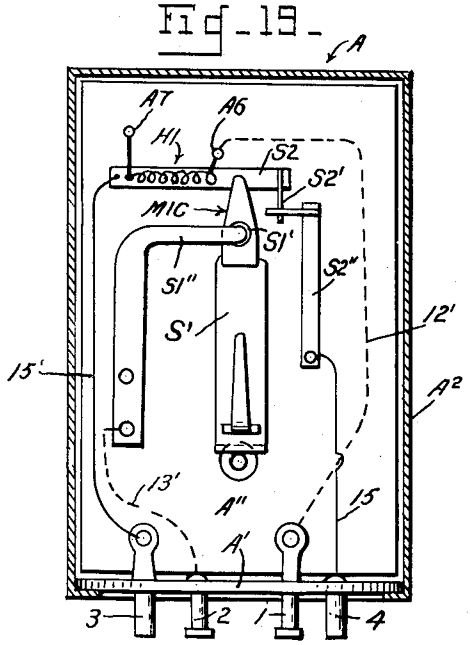
Figure 21:
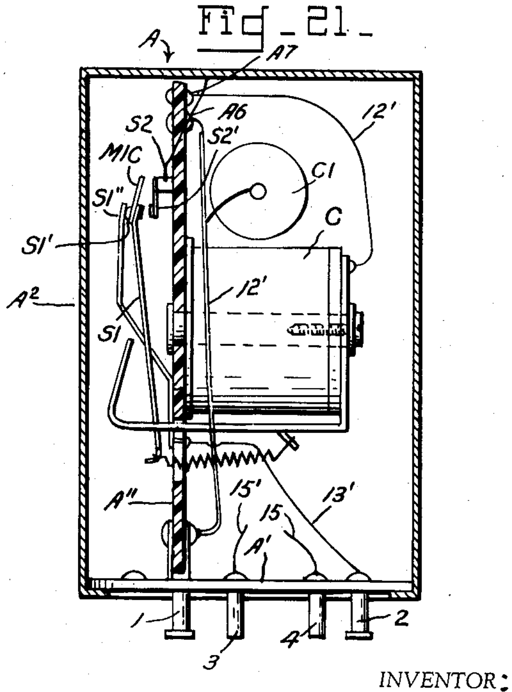

Figs. 13 and 14 are diagrammatic views of other circuits for A. C. lamps, the first using a starter without the lock-out feature, and the second including this feature.

Figs. 15, 16 and 17 are schematic obverse, reverse and side elevational views of a starter embodying the quick restarter and the lock-out means and showing only the basic features of the starter and omitting the wiring connections.

Figs. 18 to 21 are views of the starter as constructed for practical use in connection with certain of the circuits, such for example, as those shown in Figs. 4 and 5, omitting the lock-out feature.

In the schematic showing of the starters in Figs. 15, 16 and 17, A' designates an insulated base carrying contact pins 1, 2, 3, 4, and an insulated upright A'', which in practice are enclosed in a housing or casing, not shown. On this upright are mounted a relay coil C, a spring retracted relay armature switch S1, two thermally responsive or thermostatic switches S2, S3 and heaters H1, H2 and H3, for the switches, which are connected in the manner shown in those circuits employing the switch S3 and its heaters, H2 and H3 for a lock-out action, which switch and its heaters may be omitted from a starter designed for general use but used most commonly in circuits not employing a lock-out action, the inclusion or omission of such switch and its heaters involving merely changes in the wiring arrangements.

The switches, which are of self-closing type and normally closed are not physically coupled for conjoint action, but are independently movable, switch S1 under action of the coil C and switches S2, S3, in response to their heaters, with the exception that a quick restarter in the form of a mechanical interlocking connection (controlled by the armature actuated by the coil and generally designated MIC in Figs. 1 and 4 to 17) is interposed between switches S1 and S2, and is provided for holding switch S2 open together with switch S1 under the electromagnetic attraction of the coil C when the latter is energized. Coil C when energized acts only to pull switch S1 open after switch S2 has been thermally opened, and in such action moves the interlocking connection into position to hold switch S2 in its open position.

This connection comprises an insulated arm A4 carried by the armature switch S1 which is free from connection with and normally allows full opening movement of switch S2, but which is formed at its free end with a finger or projection which moves into engagement with switch S2 when switch S1 is opened to hold switch S2 open, this holding action being due to the magnetic attraction of the coil. A condenser C′ omitted in Figs. 15, 16 and 17, but shown in the various circuits, is included in the starter to reduce the arcing at the contacts in accordance with customary practice. A stop A5 is provided to limit the travel of thermal switch S3 when heated.

Figs. 18 to 21 show the starter A, as designated for practtical use in connection, for example, with circuits shown in Figs. 4 and 5, and having the circuit connections shown therein, which starter is enclosed in a can or casing A2 and is adapted to be installed in a socket such as used for an FS–44 starter.

In the drawings I have shown various types of circuits for fluorescent lamps in which the starter A, in the forms disclosed, or by simple changes in the wiring or arrangement of parts, may be used to secure prompt and reliable starting and rapid restarting actions of a lamp in good order and which may be used to secure a lockout action to avoid undue repetitive starting attempts if the lamp is defective or has reached the end of its useful life period.

Figures 1, 2, 3:
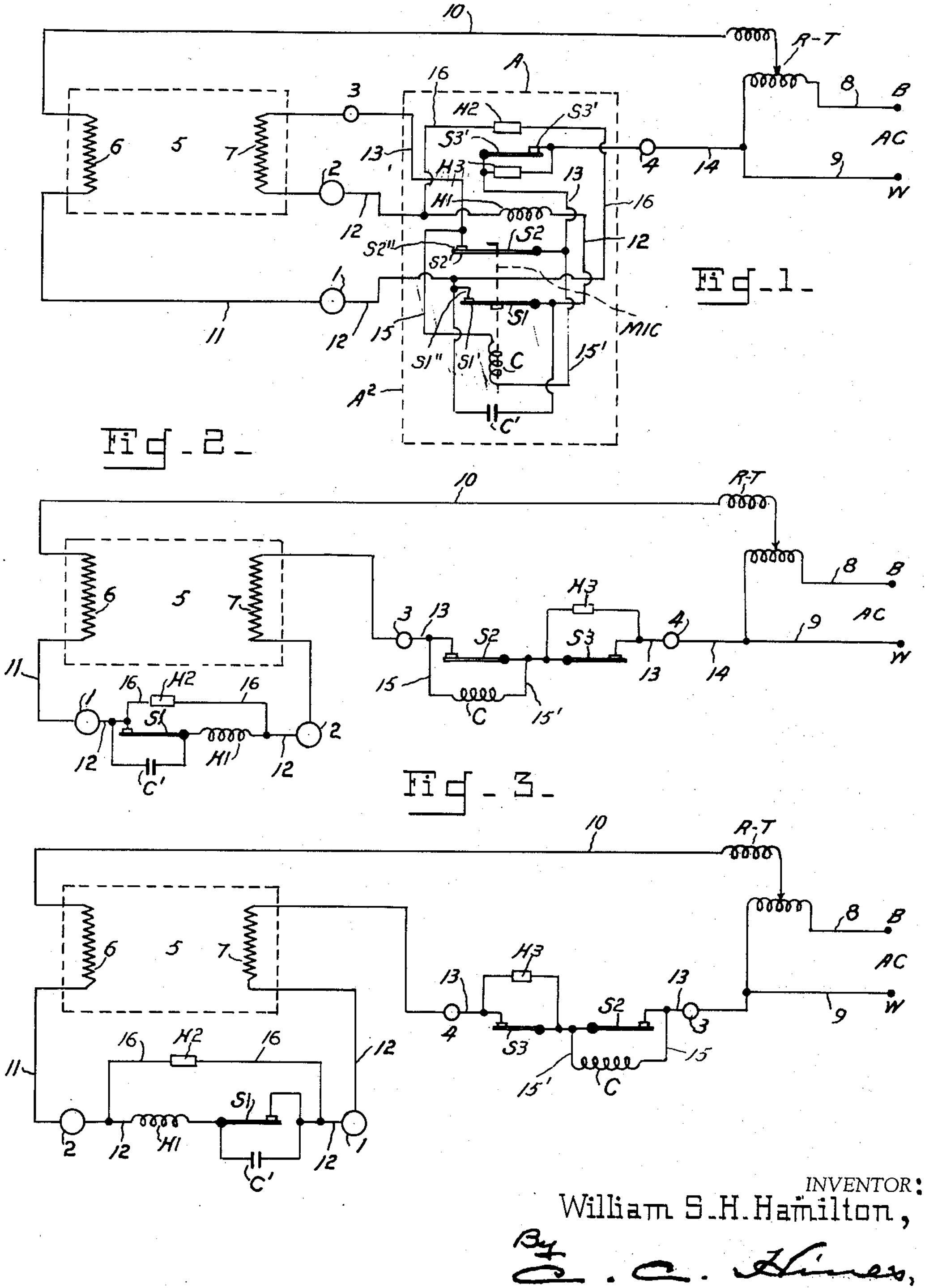
Fig. 1 is a diagrammatic view of a circuit for A. C. lamps employing a reactor-transformer and a reversible starter embodying my invention, said starter including a quick restarter as well as a lock-out means of the character described.
Figs. 2 and 3 are similar views respectively showing the starter connections in the normal and reversed positions of the starter in its socket.

Referring to Figs. 1, 2 and 3, showing a circuit for operation of 48″, T–12 lamps, and other like lamps, 5 designates the lamp having filamentary electrodes 6 and 7 which are connected in series for a preheating action, and 8 and 9 designate the line leads from the line terminals B, W. The circuit includes a reactance-transformer R—T whose primary is connected across the A. C. line and whose secondary is arranged in a conductor 10 connected with one terminal of filament 6. From the other terminal of filament 6 extends a conductor 11 leading to terminal 1 of the starter between which and the terminal 2 is serially arranged a part of the starter switch circuit including the conductors 12 and 16, the heaters H1, H2, the magnetically actuated switch S1 which normally closes said part of the starter switch circuit, and an arc suppressing condenser C′. Terminal 2 is connected to one terminal of filament 7, the other terminal of which is connected to the terminal 3 of the starter.

Terminal 3 in turn is connected to a second part of the starter switch circuit and a lock out circuit connected in series with each other and with the starter terminal 4, from which leads a conductor 14 which is connected with the conductor 9 and primary of the reactor-transformer. The second part of the starter switch circuit includes the conductor 13 containing the normally closed thermostatic switch S2, whose heater H1 is arranged in the conductor 12, and the lockout means which includes the normally closed thermostatic switch S3 and one of its heaters, H3, its other heater H2 being connected to conductor 16. Connected across the switch S2 and normally shunted thereby out of the path of flow of preheating current is a circuit connection comprising conductors 15, 15′ including the relay coil C.

The connection 15, 15′ containing the coil forms with conductors 13 and 14 and switch S3, when switch S2 is open, part of the lamp operating circuit, which also includes the conductor 8, the reactor-transformed R—T, filaments 6 and 7 and gas of the lamp 5. When the switches S1, S2 and S3 are closed a preheating or starting circuit excluding the coil but including the conductors 10, 11, 12, 13, 14 and the switches S1, S2 and S3 is formed, which connects both filaments in series with each other and the line for preheating the filaments when the line circuit is closed. Heater H1 may be an open coil heater of 5–10 ohms resistance. Heaters H2, H3 are preferably carbon rod resistors of approximately 30,000–50,000 ohms each.

In starting, current flows from line terminal B through the reactor-transformer R—T back to the other line terminal W. It also flows through the secondary winding of the reactor transformer to conductor 10, which steps up the voltage above that of the line voltage. Current then flows through filament 6, switch S1 and heater H1 and through filament 7 and switches S2, S3 back to line terminal W. As heater H2 is of high resistance compared to heater H1 and is connected across switch S1 and heater H1, it (heater H2) is short circuited and has no effect on the initial firing. Also as heater H3 is connected across switch S3 it is short circuited until this switch opens.

Current flows through the circuit until heater H1 heats switch S2 sufficiently to cause it to open its contacts S′, S2″. Opening of switch S2 allows the coil C to be energized which causes the coil to break the contacts S1′, S1″ of switch S1 rapidly, thereby breaking the inductive circuit through the reactor-transformer and causing the lamp to fire if it is a normal one in good condition. The condenser C′ absorbs the arcing when switch S1 opens. When the lamps fires, current flows through conductor 10, filament 6 of the lamp, through the gas in the lamp to the filament 7 and back through the coil C and switch S3 to the line terminal W. When heater H1 cools off, the mechanical interlock MIC prevents switch S2 from reclosing its contacts and short-circuiting the coil C.

It will be noted at this time that heater H2 has some heat applied to it, but this is not enough to cause switch S3 to open. Therefore, if the line current is interrupted coil C will be de-energized and switches S1 and S2 will return to the position shown in Figs. 1, 2 and 3, where they are ready to initiate another starting action immediately upon the line circuit being reclosed.

However, if the lamp is defective, or has reached the end of its useful life, it will not fire on the first opening of the switch S1 and may not fire on several other switch openings. The repeated opening and closing of the switch S1 gradually builds up heat in heater H2, inasmuch as the voltage applied across this heater when switch S1 is open and the lamp has not fired is greater than when the switch S1 is open and the lamp has fired normally. The accumulative effect of this heat finally causes the contacts S3′, S3″ of switch S3 to open. As soon as this switch opens, heater H3 is cut into the circuit in series with heater H2 and flow of current to the lamp is effectively cut off, as the small current flowing through heater H3 will not maintain the relay in the position where switch S1 is open and this switch accordingly recloses and short-circuits heater H2. This increases the current through heater H3 and enables it to keep switch S3 in its open position and the lamp from attempting to fire.

Switch S3 has a desirable function, in addition to that of effecting the lock-out action. While lamps of the 48″, T–12 type allow operation of a lock-out starter into lockout position after they have reached the end of their useful life, they may still continue to pass current at a low value unless one filament is disconnected from the line, which is not effected at all or with certainty by many starters of this type in general use. This low current passage usually causes flickering or "ghost lighting" which is annoying and objectionable. My improved type of starter effectually overcomes this objection in an obvious manner.

After switch S3 has opened, there will be a delay if the line circuit is opened before the starter returns to its normal position shown in Fig. 1. However, if it is noted that there is a defective lamp in the circuit, and the lamp is replaced by a new lamp, then it is either necessary to remove the starter from its socket for a few minutes or to replace it with a new starter for prompt operation to start the new lamp. If the starter is removed for this purpose, it can be used again with some other lamp, as it will not have been damaged in any way.

Fig. 2 shows schematically the arrangement of parts for current flow when the starter is mounted normally in its receiving socket. Fig. 3 shows schematically the arrangement of the parts for circuit flow when the starter is reversed in the socket.

Figures 7, 8, 9:
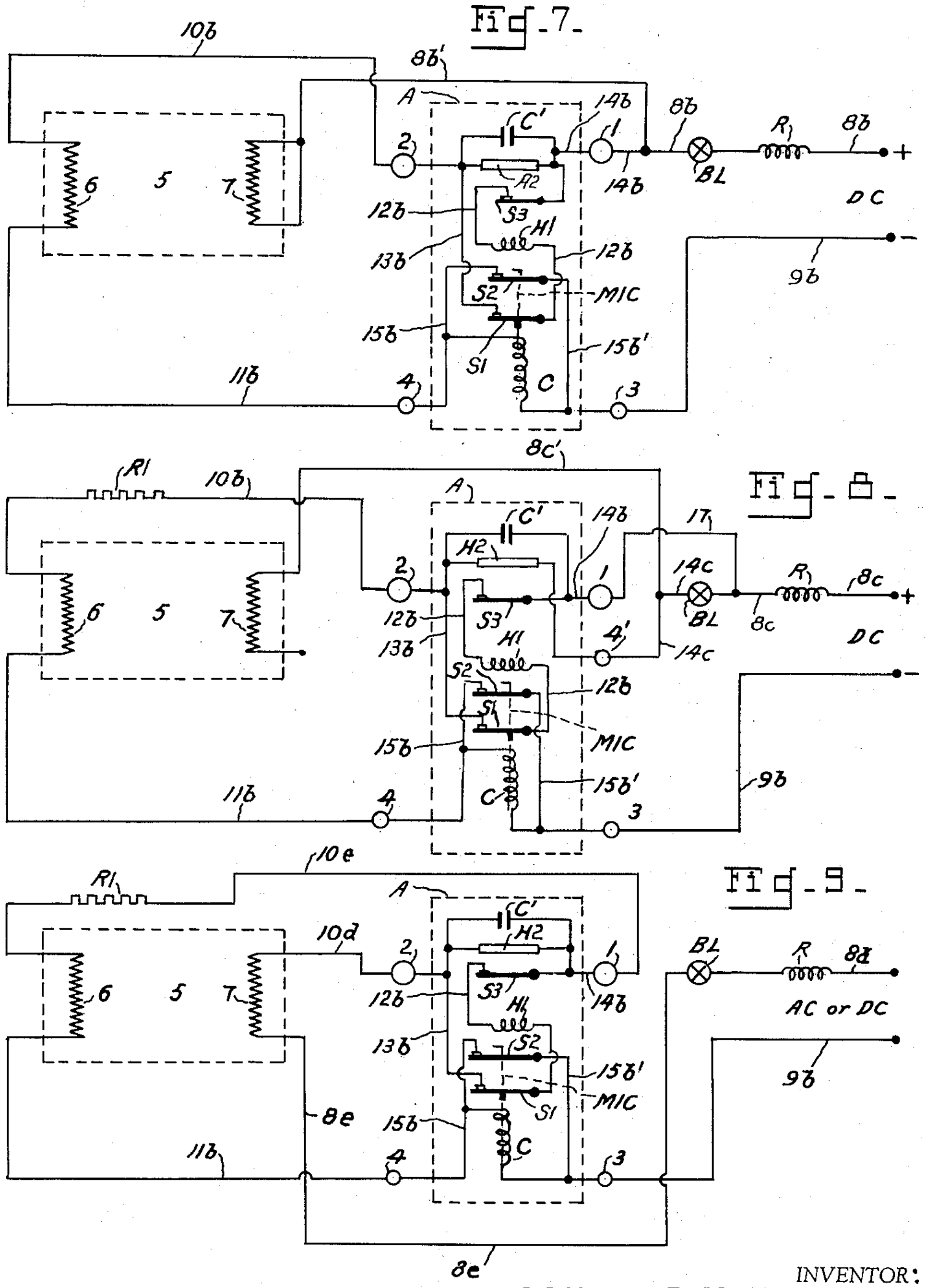

The circuits shown in Figs. 4 to 14, inclusive, are of simpler construction than that shown in Fig. 1, but all the circuits except Fig. 8 may be used with a starter constructed as shown in Figs. 15, 16, 17 or as shown in Figs. 18 to 21, said starter having a four-pin base and including or not the lock-out feature involving the switch S3 and its heaters H2 and H3 and their wiring connections. Essentially the starter comprises a small relay for opening one switch by magnetic means and, by means of a mechanical interlock, holding open a second switch of the thermal type which is normally first opened by a heater and which permits the relay to function and hold both switches open while the lamp is operating. The second thermal element or switch S3 and its heaters H2 and H3 may be added when a lockout action is desired or is for any purpose required.

Figs. 4, 5 and 6 show simpler forms of circuits than that shown in Figs. 1, 2 and 3 and are designed respectively for use in connection with different types of lamps from that used with Figs. 1, 2 and 3, each circuit employing a starter having the quick-restart mechanical interlocking connection but devoid of the lock-out feature.

In Fig. 4, showing a circuit designed for use with D. C. lamps, a reactor R and a ballast lamp BL are arranged in lead 8′ between the positive line terminal and a lead 8² extending to the electrode 7, which is short-circuited, said conductors being coupled through connection 14′ with the starter terminal 1. A conductor 9′ leads from the negative terminal of the line to starter terminal 3, and a conductor 10′ leads from the starter terminal 2 to the input end of electrode 6, which is connected at its output end by conductor 11′ to the starter terminal 4.

Switch S1 is arranged here to normally connect conductors 12′, 13′ leading respectively from the starter terminals 1 and 2 and forming therewith one branch of the preheating or starting circuit, while the thermostatic switch S2 is arranged to normally connect conductors 15, 15′ leading from the starter terminals 4 and 3 and forming the other branch of the preheating or starting circuit. In the conductor 12′ is arranged the heater H1 and across the conductors 12′ and 13′ is arranged the arc-suppressing condenser C′, while the coil C is arranged in a connection across the conductors 15, 15′ so as to be short-circuited as long as switch S2 is closed.

In starting, preheating current flows from the positive side of the line through the reactor, through the ballast lamp BL, to terminal 1 of the starter, through heater H1, through the switch S1, to terminal 2 of the starter, through conductor 10′ and the negative filament of the fluorescent lamp to terminal 4 of the starter, through thermal switch S2 to terminal 3 of the starter, and thence to the negative side of the line. At this time the relay coil C is short circuited by thermal switch S2.

A connection 8² is also made from the low side of the ballast lamp to the short-circuited positive filament of the fluorescent lamp. It should be emphasized in this connection that the positive filament of the fluorescent lamp can be short-circuited or left open circuited as in the circuits shown in Figs. 5, 8 and 10, depending on the characteristics of the different types of lamps with which these circuits are used.

Returning now to Fig. 4, preheating current continues to flow until heater H1 heats thermal element S2 sufficiently to cause it to open its contacts. When this occurs, coil C is cut into the circuit and opens switch S1 by magnetic action, breaking the circuit between the positive side of the line and the negative filament rapidly, and causing the reactor to give an inductive kick to start the lamp.

This causes the lamp, if in good condition, to fire and after it has fired, operating current flows from the positive side of the line, through the reactor, through the ballast lamp, to the positive filament 7 of the fluorescent lamp, through the gas in the lamp itself to the negative filament 6, thence to terminal 4 of the starter, through coil C to terminal 3 of the starter and thence to the negative side of the line. Coil C being energized, holds switch S1 open directly by magnetic action, and by means of the mechanical interlock MIC it also holds thermal switch S2 open, so that its contacts S², S²′′ cannot reclose after heater H1 cools off.

If while the lamp is operating normally, the line circuit is opened, coil C immediately allows switch S1 to reclose and through the mechanical interlock MIC also allows thermal switch S2 to reclose, so that the starter is ready for another restarting action as soon as the line circuit is reclosed. No time is lost waiting for a thermal element to cool off, as in a straight thermally operated starter.

If the lamp does not fire on the first attempt, the above starting action is repeated until the lamp either fires, or shows by continued applications and removals of current, that it is a defective one and should be replaced.

In this arrangement the ballast lamp is in the circuit during starting and regulates the amount of preheating current as well as the amount of operating current after the lamp has fired.

Fig. 5 shows a circuit generally similar to that shown in Fig. 4 and in which like parts are designated by the same reference characters, the difference being that electrode 7 instead of being shorted has one of its terminals connected with the conductor 8², and the ballast lamp BL is arranged in conductor 8² and that conductor 10ᵃ extending between the starter terminal 2 and electrode 6 contains a current limiting resistance R1.

It will be noted that this circuit differs from that shown in Fig. 4 in that the ballast lamp is not included in the circuit during starting. This enables the preheating current to be regulated by the resistance R1 and the operating (or running) current to be regulated by the ballast lamp, separately from each other, which is a flexible and desirable arrangement.

The operation of the starter is the same as that shown in Fig. 4 and heretofore described in detail.

Figure 6 shows a circuit adapted for use with either A. C. or D. C. lamps in which the parts of the starter and their connections are the same as shown in Figs. 4 and 5 and are designated by similar reference characters, but in which the current flow connections are differently arranged. As shown, conductor 8′ containing the reactance R and ballast lamp BL is connected with the input end of electrode 7 which is connected at its output end through the starter terminal 2 and starter switch S1 to starter terminal 1 from which the conductor 10a′ containing the current limiting resistance R1 extends to the input terminal of the electrode 6.

In this circuit on starting, preheating current flows from one terminal of the line, through the reactor, through the ballast lamp (if used), through filament 7 of the fluorescent lamp to terminal 2 of the starter, through switch S1 and heater H1, to terminal 1 of the starter, through resistance R1, to and through the filament 6 of the lamp, to terminal 4 of the starter, through terminal switch S2, to terminal 3 of the starter, and thence to the other side of the line. As in Figs. 4 and 5, thermal switch contacts S2, S2″ short-circuit the coil C during the preheating action.

Preheating current continues to flow until heater H1 heats thermal element S2 sufficiently to cause it to open its contacts. When this occurs coil C is cut into the circuit and opens switch S1 by magnetic action, breaking the preheating circuit rapidly and causing the reactor to give an inductive kick to start the lamp.

This causes the lamp if in good condition to fire, and after it has fired, operating (or running) current flows from one terminal of the line, through the reactor, through the ballast lamp (if used), to filament 7 of the fluorescent lamp, through the gas in the lamp to the filament 6, thence to terminal 4 of the starter, through coil C, to terminal 3 of the starter, and thence to the other side 9′ of the line. Coil C being energized holds switch S1 open directly by magnetic action and by the mechanical interlock MIC prevents thermal switch S2 from reclosing its contacts after heater H1 has cooled off.

As in Figs. 4 and 5, if while the lamp is operating normally the line circuit is opened, de-energization of coil C immediately allows switch S1 to reclose and through the mechanical interlock also allows thermal switch S2 to reclose, so as to be ready for another starting action as soon as the line circuit is reclosed.

If the lamp does not fire on the first attempt, the above starting action is repeated until the lamp either fires, or shows by continued ineffective applications of current that it is a defective one and should be replaced.

Figs. 7 to 12, inclusive, show circuits embodying the lock-out feature and using a starter similar in construction to that shown in Fig. 1 except with regard to the wiring between the starter circuit connections and the starter terminals and the arrangement of the line and lamp connections for flow of the preheating and operating currents. These circuits also differ from that shown in Fig. 1 in the use of a reactor, with or without a ballast lamp, instead of using a reactor-transformer.

In the circuit for D. C. lamps shown in Fig. 7 positive conductor 8*b*, containing the reactor R and ballast lamp BL, leads to conductor 14*b* and starter terminal 1 and has a branch 8*b*′ leading from it, at a point between ballast lamp BL and starter terminal 1, to the electrode 7, which is short-circuited, a conductor 10*b* leads from the starter terminal 2 to one terminal of electrode 6, a conductor 11*b* leads from the other terminal of electrode 6 to the starter terminal 4 and negative conductor 9*b* is connected with starter terminal 3. The arrangement of conductors 12*b*, 13*b*, 14*b*, 15*b*, 15*b*′, coil C and switches S1, S2 in this circuit is similar in certain respects to that of the arrangement of like functioning parts of the circuit shown in Fig. 1, except as to change including the use of thermal switch S3 and its heater H2 of high resistance and the omission of heater H3.

In starting, preheating current flows from the positive side of the line, through the reactor, through the ballast lamp to terminal 1 of the starter, through thermal switch S3, through heater H1, through switch S1, to terminal 2 of the starter, to and through the negative filament 6 of the fluorescent lamp, thence to thermal 4 of the starter, through thermal switch S2 to terminal 3 of the starter, and thence to the negative side of the line. During this time thermal switch S2 keeps coil C short circuited, and heater H2 is effectively short circuited due to its being much higher in resistance than heater H1.

It will be noted in this circuit the ballast lamp is in the circuit during preheating and regulates the preheating current, as well as the operating current after the lamp has fired.

Preheating current continues to flow until heater H1 heats up sufficiently to cause the thermal switch S2 to open its contacts. This cuts coil C into the circuit, which opens switch S1 by magnetic action, thus breaking the preheating circuit rapidly, and causing the lamp if it is a good one to fire.

After the lamp fires, operating current flows from the positive side of the line, through the reactor and ballast lamp to the positive filament 7 of the fluorescent lamp through the gas in the lamp itself to the negative filament 6, thence to terminal 4 of the starter, through relay coil C to terminal 3 of the starter, and thence to the negative side of the line. The current flowing through coil C holds switch S1 open by magnetic action and thermal switch S2 is held open by the mechanical interlock MIC.

During normal operation, heater H2 is connected across the fluorescent lamp itself, but the voltage drop across the lamp is not sufficient to cause it to heat up sufficiently to cause thermal elements S3 to open its contacts.

If the line circuit is opened, switches S1 and S2 reclose immediately, so that the starter is ready for another starting action as soon as the line circuit is reclosed.

Should the lamp not fire on the first attempt however, it will make several other attempts to fire, and each time that it does, the voltage applied across heater H2 will be greater with switch S1 open while the lamp has not fired than if it had fired, this voltage being substantially line voltage, instead of lamp voltage. After a number of attempts to start, heater H2 will be heated sufficiently to cause the thermal switch S3 to open its contacts. This interrupts the circuit to the lamp, except for the small amount of current flowing through heater H2, which will be substantially equal to line voltage being applied across heater H2, and which will be ample to hold switch S3 in its open position and cut out the starter although switches S1 and S2 will reclose.

Under this condition, an appreciable time delay will be required (several minutes), when the circuit is opened for heater H2 to cool off sufficiently to allow the contacts of thermal switch S3 to reclose, so that the starter is ready to restart a lamp.

However, this delay can be avoided by replacing the defective fluorescent lamp and the starter at the same time. The starter can then be used in some other circuit later, as it will not have been damaged in any way.

The circuit shown in Fig. 8 is generally similar to that of Fig. 7 except that conductor 8*c*′ leading to the open-circuited electrode 7 is directly connected with conductor 14*c*, that a current limiting resistance R1 is provided in conductor 10*b*, and that a conductor 17, connecting conductor 8*c* with starter terminal 1, is connected directly to the reactor ahead of the ballast lamp.

Thus while this circuit employs a multiple action lockout feature, the ballast lamp is not in the circuit during preheating, which allows the preheating current to be adjusted separately by resistor R1. Also in order to get the heater H2 across the lamp voltage after the lamp has fired, it is necessary to use a special terminal, as indicated at 4′.

In this circuit when starting, preheating current flows from the positive side of the line through the reactor, to terminal 1 of the starter, through thermal switch S3, through heater H1, through switch S1, to terminal 2 of the starter, through resistance R1, through the negative filament 6 of the fluorescent lamp, to terminal 4 of the starter through thermal switch S2, to terminal 3 of the starter, and thence to the negative side of the line. A connection 14*c* is also made from the low side of the ballast lamp to terminal 4′ of the starter and through conductor 8*c*′ to the positive filament 7 of the fluorescent lamp, which in this case is not short circuited. In the above described starting action, heater H2 is effectively short-circuited by switch S1, heater H1 and switch S3.

Preheating current continues to flow until heater H1 heats thermal switch S2 sufficiently to cause it to open its contacts. When this occurs, coil C is energized by preheating current flowing through negative filament of the lamp, causing it to open switch S1 and break the preheating circuit rapidly, thus firing the lamp, if in normal condition. After the lamp has fired, coil C is kept energized by current flowing through the lamp.

The operating circuit is from the positive side of the line, through the reactor, through the ballast lamp, to the positive filament 7 of the fluorescent lamp, through the gas in the lamp to the negative filament 6, thence to terminal 4 of the starter, through coil C to terminal 3 of the starter, and then to the negative side of the line.

Heater H2 being connected between terminals 2 and 4′ of the starter, has only the voltage drop across the fluorescent lamp itself applied to it, and as in the case of Fig. 7, this voltage does not heat heater H2 enough to cause thermal switch S3 to open its contacts.

This modified form of starter cannot be changed in its position in the socket due to the special 5-contact base, so that there is no danger of interchanging any of the above connections.

If the line circuit is opened, switches S1 and S2 immediately reclose and the starter is ready for another starting action.

If, however, the lamp does not fire on the first attempt, it will make several other attempts, and each time that switch S1 opens and the lamp does not fire, substantially line voltage will be applied to heater H2, so that it will heat up and cause thermal switch S3 to open. When switch S3 opens, current is removed from the lamp, except for the small amount of current that flows through heater H2 which is of high resistance. Switches S1 and S2 reclose, but as long as the line circuit is closed heater H2 holds switch S3 open.

With this condition, an appreciable time delay will be required (several minutes) when the line circuit is opened for heater H2 to cool off sufficiently to allow thermal switch S3 to reclose its contacts.

This time delay can be avoided, however, by replacing the defective fluorescent lamp and the starter at the same time. The starter can then be used in some other circuit later, as it will not have been damaged in any way.

The circuit shown in Fig. 9 varies from those shown in Figs. 7 and 8, in that one line conductor *8d* is connected by a conductor *8e* with one terminal of electrode 7, the other terminal of which is connected by a conductor *10d* with starter terminal 2, while a conductor *10e* containing a current limiting resistance R1, connects the starter terminal 1 with the input terminal of electrode 6, the arrangement of the switches S1, S2 and S3 and coacting parts of the starter being otherwise the same as that shown in Fig. 8.

This circuit is suitable for operating either A. C. or D. C. fluorescent lamps. When used on D. C., it has the disadvantage of having the ballast lamp in the circuit during starting. When used on A. C., the ballast lamp and resistor R1 can be omitted if the other requirements of the circuit permit it.

In this circuit when starting, preheating current flows from one side of the line through the reactor, through the ballast lamp (if used) through filament 7 of the fluorescent lamp to terminal 2 of the starter, thence through switch S1, heater H1 and thermal switch S3 to terminal 1 of the starter, and through resistance R1 and filament 6 of the fluorescent lamp to terminal 4 of the starter, through thermal switch S2 to terminal 3 of the starter, and thence to the other side of the line. In this connection it should be borne in mind that on A. C. circuits, resistance R1 might be zero, and there might not be a ballast lamp, but the circuit path would be the same.

As in the preceding circuits, preheating current continues to flow until heater H1 heats up sufficiently to cause thermal switch S2 to open its contacts, which cuts coil C into circuit and causes switch S1 to open magnetially, thus breaking the preheating circuit rapidly and causing the lamp to fire if it is in good condition. While the lamp is operating (or running) normally, coil C is kept energized by current flowing through the lamp and holds switch S1 open by magnetic action and thermal switch S2 open by means of the mechanical interlock MIC.

While the lamp is operating normally, heater H2 is connected across the lamp voltage, which is not enough to heat it sufficiently to cause thermal switch S3 to open.

The operating circuit is from one side of the line, through the reactor, through the ballast lamp (if used), to filament 7 of the fluorescent lamp, through the gas of the lamp itself to the other filament 6, thence to terminal 4 of the starter, through coil C to terminal 3 of the starter and back to the other side of the line. If while the lamp is operating normally, the line circuit is opened, switches S1 and S2 will reclose immediately, ready for another starting action.

If the lamp does not start, however, the starter makes successive attempts to start it, and each time switch S1 opens and the lamp does not fire, essentially line voltage is applied across heater H2. The repeated application of this higher voltage causes heater H2 to heat up sufficiently to cause thermal switch S3 to open, which cuts off all current to the lamp except the small amount passing through heater H2 which is of high resistance. Switches S1 and S2 reclose under this condition.

As in the other circuits employing the multiple action lockout feature an appreciable time delay (several minutes) will be required for heater H2 to cool off sufficiently to allow thermal switch S3 to reclose after the line circuit is opened. However, this time delay can be avoided by replacing the defective fluorescent lamp and the starter at the same time. The starter can then be used later in some other circuit, as it will not have been damaged in any way.

Fig. 10 shows a circuit for D. C. lamps which is essentially the same as that shown in Fig. 8 except for a change in arrangement of heater H2, the addition of a heater H3 and the use of a conductor *8g* containing the ballast lamp BL and connecting conductor *8f*, at a point between the reactor R and the starter terminal 1, with the lamp electrode 7, which is open-circuited. Heater H2 is here shown arranged in connection *12b* and heater H3 in a connection between H1 and terminal 1. These changes make it possible to secure the lockout action and still use only a 4-terminal base for the starter.

Heater H2 in this case is of such resistance and so located that the current flowing through it during a starting action will not heat it enough to cause thermal switch S3 to open its contacts, but the repetitions of starting actions, such as occur with a defective lamp or one that has reached the end of its useful life, will heat heater H2 sufficiently so that it will cause thermal switch S3 to open its contacts. Heater H3 is of high resistance as compared with heaters H1 and H2, but once the contacts of thermal switch S3 have opened, it has substantially line voltage applied across it to keep the contacts of thermal switch S3 open.

In this circuit when starting, preheating current flows through the reactor to terminal 1 of the starter, through switch S3, heaters H2 and H1, through switch S1 to terminal 2 of the starter, through resistance R1, through the negative filament 6 of the lamp to terminal 4 of the starter, through thermal switch S2 to terminal 3 of the starter, and thence back to the negative side of the line. Heater H2 as described above, is of relatively low resistance, but is so proportioned and so located with respect to heater H1 that it does not act as quickly on thermal switch S3 as heater H1 does on thermal switch S2.

Therefore during a normal starting action it plays no part. Heater H3 is effectively short-circuited during a normal starting action.

The flow of preheating current continues until heater H1 has heated sufficiently to cause thermal switch S2 to open its contacts. When they open, they cut coil C into the circuit. This causes the coil to open switch S1 by magnetic action and break the preheating circuit through the lamp rapidly. This causes the lamp, if in good condition to fire, and after it has fired, operating current flows from the positive side of the line through the reactor, through the ballast lamp, to the positive filament 7 of the lamp, through the gas in the lamp itself to the negative filament 6, thence to terminal 4 of the starter, through coil C to terminal 3 of the starter, and thence to the negative of the line. Coil C being energized, holds switch S1 open by magnetic action, and by means of the mechanical interlock MIC also holds the contacts of thermal switch S2 open after the heater H1 cools off.

If while the lamp is operating normally, the line circuit is opened, coil C immediately allows switches S1 and S2 to reclose, so as to be ready for another starting action, as has been previously described in connection with the other circuits.

A normal starting action does not heat heater H2 sufficiently for it to have effect enough on thermal switch S3 to cause it to open its contacts, and once the lamp has fired, all heat is removed from heater H2.

Should the lamp fail to start, however, it will make several attempts to do so and each time the heat in heater H2 is increased, until it heats up sufficiently to cause thermal switch S3 to open its contacts. The opening of switch contacts S3 cuts current off the lamp and also connects heater H3 effectively across the line. H3 is of high resistance but of sufficient capacity to keep thermal switch S3 open. Switches S1 and S2 reclose under this condition. The only current flowing through the circuit is the small amount through heater H3.

As in the circuits previously described having the multiple action lockout feature, an appreciable time delay (several minutes) will be required when the line circuit is opened for heater H3 to cool sufficiently to allow thermal switch S3 to reclose its contacts, so that the starter is ready to restart a lamp. This time delay can be avoided, however, by replacing the defective fluorescent lamp and the starter at the same time. The starter can then be used in some other circuit later, as it will not have been damaged in any way.

Figure 11 shows an operating circuit suitable for A. C. or D. C. fluorescent lamps and which also has the multiple action lock-out feature. It differs from the circuit shown in Fig. 9 only with respect to the arrangement of the parts of the starter which are the same as in Fig. 10.

In this circuit when starting, preheating current flows from one side 8*h* of the line through the reactor, through the ballast lamp (if used), through filament 7 of the fluorescent lamp to terminal 2 of the starter, through switch S1, heater H1, heater H2, thermal switch S3, to terminal 1 of the starter, through resistance R1, through the other filament 6 of the fluorescent lamp to terminal 4 of the starter, through thermal switch S2 to terminal 3 of the starter, and thence to the other side of the line. The action both in normal starting and in cut out actions is substantially the same as described with respect to Fig. 10, except that both filaments of the lamp are used in starting, and will therefore not be described in detail.

Fig. 12 shows an operating circuit for short A. C. lamps and having the multiple lock-out feature and which is substantially the same as the circuit shown in Fig. 9 with the exception of the omission of all features pertaining to D. C. operation. The operation is the same as that of the circuit of Fig. 9 and thence need not be described in detail.

An advantage of this circuit is that it can be used satisfactorily for relatively short A. C. fluorescent lamps that do not have sufficient voltage applied to them (particularly when they have not fired) to cause current flow at low values after thermal switch S3 has opened its contacts. With the connections shown, line voltage is still applied across the fluorescent lamp itself, even after thermal switch S3 has opened its contacts.

Fig. 13 shows an operating circuit for A. C. fluorescent lamps using a starter without the lockout feature and in which the parts are so arranged that the preheating or starting current and the operating current may be separately adjusted. This is desirable in the case of lamps that are to fire and operate at low temperatures (0° F. and below). The starter here shown is generally similar to that shown in Figs. 4, 5 and 6, with a certain change in construction, and is used with certain changes in the circuit. As shown, the switches S1, S2 and conducting connections 13′, 12′, 15, 15′ and 14′ are similarly arranged to correspondingly functioning parts shown in Figs. 4 and 5, but there are changes and additions in the circuit connections.

Conductors 9*b* and 11*b* are here arranged as in Figs. 4, 5 and 6, but conductor 8*m* extends from line terminal B to one terminal of electrode 7, having its opposite terminal connected to starter terminal 2, while conductor 10*m* connects starter terminal 1 with the input terminal of electrode 6. Resistance R1 is used in this circuit to control the preheating circuit, and the ballast lamp BL and a resistance R2 are provided in a connection across the starter terminals 3, 4, to control the operating current. A resistance R3 is also added in series with the coil C in order to have it operate properly across the increased voltage drop of resistance R2 and the ballast lamp after the lamp is started into operation.

In this circuit when starting, preheating current flows from terminal B of the line through the reactor, through filament 7 of the fluorescent lamp to terminal 2 of the starter, through switch S1, through heater H1, to terminal 1 of the starter, through resistance R1, through the filament 6 of the fluorescent lamp to terminal 4 of the starter, through the contacts of thermal swich S2 to terminal 3 of the starter and thence back to the other terminal line W. During he starting action, thermal switch S2 contacts short-circuit the relay coil C and resistance R3, as well as the ballast lamp and resistance R2.

The flow of preheating current continues until heater H1 has heated thermal switch S2 sufficiently to cause it to open its contacts. When this occurs, coil C is cut into the circuit, which opens contacts S1 by magnetic action, breaking the preheating current rapidly and causing the lamp if in good condition to fire.

After the lamp has fired, operating current flows from one side B of the line through the reactor, to filament 7 of the fluorescent lamp, through the gas in the lamp itself to the other filament 6, thence to terminal 4 of the starter, where it divides, part flowing through coil C and resistance R3 to termnal 3 of the starter, and the other part through the ballast lamp and resistance R2 connected across the same terminals of the starter, thence to the other side W of the line. Ballast lamp BL and resistance R2 can be selected to provide the proper operating (running current) thus permitting the reactor to be made of less reactance than would usually be the case, in order to allow more current to flow during preheating and make starting of the fluorescent lamp easier at low temperatures, such as 0° F. and below.

As in the other circuits previously described, if the line circuit is opened while the lamp is operating normally, coil C of the relay is de-energized, allowing switches S1 and S2 to reclose immediately ready for another starting action.

If the lamp fails to start the first time, it will make other attempts to do so and if not successful will keep on trying, calling attention by its repeated applications and removals of current to there being a defective lamp in the circuit.

Fig. 14 shows a circuit similar to Fig. 13 except that it includes the lockout feature as shown in the lockout circuit constructions previously described, and its operation is the same as that of Fig. 13 for a normal firing lamp.

During a normal starting action, heater H2 is effectively short-circuited and takes no part in it. After the lamp has fired, heater H2 is connected across lamp voltage but this does not produce enough heat in it to cause thermal switch S3 to open its contacts.

If the lamp does not fire on the first attempt, however, the starter will make a number of other attempts to do so. Each time that switch S1 is opened with the lamp not having fired, essentially line voltage is impressed across the heater H2, finally heating it sufficiently to cause thermal switch S3 to open its contacts.

In the open position of thermal switch S3, heater H2 is practically across line voltage and this opens the circuit to the lamp, except for the small amount of current passing through heater H2. Switches S1 and S2 reclose under this condition. Line voltage is applied across the lamp terminals in the cut-out position.

As in the case of the other figures previously described having the multiple action lockout feature, an appreciable time delay will be involved after the line circuit is opened for heater H2 to cool off sufficiently to allow thermal switch S3 to reclose its contacts.

This time delay can be avoided by replacing the defective fluorescent lamp and the starter at the same time as has been previously described.

A starter embodying the present invention has the following two major advantages over prior starters, to wit, (1) The preheating or starting circuit is broken rapidly by the opening of switch S1 by magnetic means. This causes the reactor to give a higher inductive kick than that obtained from the slower opening of straight thermal or glow switch starters when used in the same circuits. The higher inductive kick not only makes the firing more certain, but will also effect the firing of lamps that might be discarded under the impression that they had reached the end of their useful life period. (2) In all normal operation of the lamps, due to the switch S1 being held open magnetically by the coil C by the flow of current through the lamp, the switch will open immediately if the line circuit is opened, and in so doing allow switch S2 to also reclose, so that the starter is ready for another starting action as soon as the line circuit is reclosed. This is not so in the case of a straight thermal starter, where it is necessary for the heater to cool off before its contacts can reclose.

This ability of obtaining a quick resetting action of the parts to obtain an immediate restart applies, of course, to the starters used with or without the lock-out feature and when the starter is used with a good lamp. In the case of the use of a starter having the lock-out feature, however, the thermal units used for the lock-out action if they come into action take an appreciable length of time (several minutes) to cool off before a restarting action can again take place. However, this delay can be avoided, as previously pointed out, when applying a new lamp in place of the defective lamp, by removing the starter which has been in use and applying a new starter, in which case the starter removed may be used as soon as it cools off in some other circuit.

From the foregoing description, taken in connection with the drawings, the construction and operation of the starter and various circuits disclosed will be readily understood without a further and extended description, and it will be seen that the invention provides a starter of simple and economical type which facilitates and renders easier the starting of hard starting lamps, and one which, if desired, provides means for locking out the starter from continuous or undesired repeating actions to prevent damage to the starter or other components of the circuit in the case of a defective lamp, or a lamp which has reached the end of its useful life. While the constructions shown for these purposes are preferred, it is to be understood that they are merely exemplificative, and that changes in the form, construction and arrangement of parts, falling within the scope of the appended claims, may be made without departing from the spirit of the invention.

Having thus described my invention, I claim:

1. A system for supplying preheating and operating current to a discharge device comprising the combination of a supply line, a gaseous electric discharge device having two electrodes at least one of which is constructed to receive preheating current, a normally closed thermally operated switch and a normally closed electromagnetic switch, means including an inductive reactance device and the winding of said electromagnetic switch for connecting said electrodes with said line, a preheating circuit capable of producing firing temperature electrode heating, said circuit extending from one side of said line and including in series connection said inductive reactance device and the heater for said thermal switch and said electromagnetic switch and at least one of said electrodes and a current limiting device, said circuit continuing to the opposite side of said line, said electromagnetic switch having an armature of small inertia pivoted to be freely movable and said thermostatic switch being connected across said winding so that the opening of the thermal switch introduces said winding into the preheating circuit and causes a powerful and quick opening of the electromagnetic switch to cause the discharge device to fire by a high inductive voltage kick, and mechanical means operatively interconnecting said switches to hold the thermal switch open after the heater therefor cools, the operating current of said device continuing to energize said winding and hold both of said switches open during the operation of the discharge device.

2. A system for supplying preheating and operating current to a discharge device comprising the combination of a supply line, a gaseous electric discharge device having two electrodes at least one of which is constructed to receive preheating current, a normally closed thermally operated switch and a normally closed electromagnetic switch, the electrode to be preheated being connected to one side of said line through the winding of said electromagnetic switch and the opposite electrode being connected to the opposite side of said line through an inductive reactance device and a ballast in series connection, a preheating circuit capable of producing firing temperature electrode heating, said circuit extending from one side of said line and including in series connection said inductive reactance device and ballast and the heater for said thermal switch and said electromagnetic switch and the electrode to be preheated, said circuit continuing to the opposite side of said line, said electromagnetic switch having an armature of small inertia pivoted to be freely movable and said thermal switch being connected across said winding so that the opening of the thermal switch introduces said winding into said preheating circuit and causes a powerful and quick opening of the electromagnetic switch to cause the discharge device to fire by a high inductive voltage kick, and mechanical means operatively interconnecting said switches to hold the thermal switch open after the heater therefor cools, the operating current of said device continuing to energize said winding and hold both of said switches open during the operation of the discharge device.

3. A system for supplying preheating and operating current to a discharge device comprising the combination of a supply line, a gaseous electric discharge device having two electrodes at least one of which is constructed to receive preheating current, a normally closed thermally operated switch and a normally closed electromagnetic switch, the electrode to be preheated being connected to one side of said line, through the winding of said electromagnetic switch and the opposite electrode being connected to the opposite side of said line through an inductive reactance device and a ballast in series connection, a preheating circuit capable of producing firing temperature electrode heating, said circuit extending from one side of said line and including in series connection said inductive reactance device and the heater for said thermal switch and said electromagnetic switch and a current limiting resistance and the electrode to be preheated, said circuit continuing through said winding to the opposite side of said line, said electromagnetc switch having an armature of small inertia pivoted to be freely movable and said thermal switch being connected across said winding so that the opening of the thermal switch introduces said winding into the preheating circuit and causes a powerful and quick opening of the electromagnetic switch to cause the discharge device to fire by a high inductive voltage kick, and mechanical means operatively interconnecting said switches to hold the thermal switch open after the heater therefor cools, the operating current of said device continuing to energize said winding and hold both of said switches open during the operation of the discharge device.

4. A system for supplying preheating and operating current to a discharge device comprising the combination of a supply line, a gaseous electric discharge device having two electrodes at least one of which is constructed to receive preheating current, a normally closed thermally operated switch and a normally closed electromagnetic switch, means including an inductive reactance device and the winding of said electromagnetic switch for connecting said electrodes with said line, a preheating circuit capable of producing firing temperature electrode heating, said circuit extending from one side of said line and including in series connection, said inductive reactance device and the heater for said thermal switch and said electromagnetic switch and both of said electrodes and a current limiting resistance, said circuit continuing through said winding to the opposite side of said line, the said heater, electromagnetic switch and current limiting resistance being included in said circuit between the electrodes said electromagnetic switch having an armature of small inertia pivoted to be freely movable and said thermal switch being connected across said winding so that the opening of the thermal switch introduces said winding into the preheating circuit and causes a powerful and quick opening of the electromagnetic switch to cause the discharge device to fire by a high inductive voltage kick, and mechanical means operatively interconnecting said switches to hold the thermal switch open after the heater therefor cools, the operating current of said device continuing to energize said winding and hold both of said switches open during the operation of the discharge device.

5. A system for supplying preheating and operating current to a discharge device comprising the combination of a supply line, a gaseous electric discharge device having two electrodes at least one of which is constructed to receive preheating current, a normally closed thermally operated switch and a normally closed electromagnetic switch, means including an inductive reactance device and the winding of said electromagnetic switch for connecting said electrodes with said line, the said winding having a resistance in series therewith, and a ballast connected in shunt to said winding and series resistance, a preheating circuit capable of producing firing temperature electrode heating, said circuit extending from one side of said supply line and including in series connection, said inductive reactance device and the heater for said thermal switch and said electromagnetic switch and both of said electrodes and a current limiting resistance, said circuit continuing through said winding and its ballast shunt to the opposite side of said line, the said heater, electromagnetic switch and current limiting resistance being included in said circuit between the electrodes, said electromagnetic switch having an armature of small inertia pivoted to be freely movable and said thermal switch being connected across said winding so that the opening of the thermal switch introduces said winding into the preheating circuit and causes a powerful and quick opening of the electromagnetic switch to cause the discharge device to fire by a high inductive voltage kick, and mechanical means operatively interconnecting said switches to hold the thermal switch open after the heater therefor cools, the operating current of said device continuing to energize said winding and hold both of said switches open during the operation of the discharge device.

References Cited in the file of this patent

UNITED STATES PATENTS

| | | |
|---|---|---|
| 2,341,520 | Babb | Feb. 15, 1944 |
| 2,491,858 | Hehenkamp | Dec. 20, 1949 |
| 2,497,534 | Campbell | Feb. 14, 1950 |
| 2,497,542 | Frech | Feb. 14, 1950 |
| 2,513,840 | Berland | July 4, 1950 |